United States Patent [19]
Kolomyski

[11] Patent Number: 5,321,309
[45] Date of Patent: Jun. 14, 1994

[54] BATTERY SAVER MODULE FOR AUTOMOBILE COURTESY AND ILLUMINATED ENTRY LAMPS

[75] Inventor: Darrell J. Kolomyski, Mt. Clemens, Mich.

[73] Assignee: United Technologies Automotive, Inc., Dearborn, Mich.

[21] Appl. No.: 933,975

[22] Filed: Aug. 24, 1992

Related U.S. Application Data

[63] Continuation of Ser. No. 779,205, Oct. 18, 1991, abandoned.

[51] Int. Cl.$^5$ .............................................. B60Q 3/02
[52] U.S. Cl. .................................... 307/10.8; 315/84
[58] Field of Search ................... 307/10.1, 10.7, 10.8, 307/141, 141.4; 315/77, 84, 360

[56] References Cited

U.S. PATENT DOCUMENTS

| | | | |
|---|---|---|---|
| 4,071,805 | 1/1978 | Brock | 315/84 |
| 4,115,723 | 9/1978 | Byrne et al. | 315/84 |
| 4,122,371 | 10/1978 | Talmadge et al. | 315/84 |
| 4,123,668 | 10/1978 | Pecota | 307/10.7 X |
| 4,638,174 | 1/1987 | Bier | 315/84 X |
| 4,739,224 | 4/1988 | Geerlings | 315/84 |
| 4,965,461 | 10/1990 | McRoberts, Jr. et al. | 307/10.8 |
| 5,047,688 | 9/1991 | Alten | 315/84 |

FOREIGN PATENT DOCUMENTS

| | | | |
|---|---|---|---|
| 59-114138A | 7/1984 | Japan | 315/84 |
| 61-181736 | 8/1986 | Japan | 315/84 |
| 63-176755 | 7/1988 | Japan | 315/84 |

Primary Examiner—A. D. Pellinen
Assistant Examiner—Fritz M. Fleming
Attorney, Agent, or Firm—Ronald G. Cummings

[57] ABSTRACT

A battery saver module for controlling courtesy and illuminated entry lamps having inputs for receiving input signals from door handle sensors, a trunk sensor, and an ignition switch and first output connected to illuminated entry loads and a second output connected to courtesy lamp loads. A control circuit selectively activates the first and second output responsive to input signals and includes a first timer for deactivating the first output after a first time period and a second timer for deactivating the second output after a second time period.

10 Claims, 4 Drawing Sheets

BATTERY SAVER MODULE FOR AUTOMOBILE COURTESY AND ILLUMINATED ENTRY LAMPS

This is a continuation of application Ser. No. 07/779,205, filed Oct. 18, 1991, which is now abandoned.

TECHNICAL FIELD

The present invention relates to automobile lighting and more particularly to a battery saver module for controlling courtesy and illuminated entry lamps in an automobile.

BACKGROUND AND SUMMARY OF THE INVENTION

Lighting for present day automobiles generally includes illuminated entry (IE) lamps which are simultaneously activated to facilitate entry into the vehicle and a number of lamps referred to as courtesy lamps which may be individually switched or activated by the operator. Common courtesy lamps include map lamps, a vanity mirror lamp, a glove box lamp, and an engine lamp.

IE lighting generally includes a plurality of interior lamps and a key cylinder lamp. The IE lamps are usually positioned under the instrument panel and/or along the lower side panels and are activated by a door handle switch upon movement of the door handle. Upon activation by the door handle, the IE lamps remain on for a predetermined period such as 25 seconds to aid the operator in unlocking the car door, entering the automobile and locating the ignition. The IE lamps also provide a safety feature in that the interior of the automobile is illuminated before the operator opens the door. Often times the dome lamp is connected into the IE lighting scheme so that the interior is fairly well illuminated. The IE lights remain on until the predetermined time period has elapsed or until operation of the ignition.

With courtesy lamps, if the operator inadvertently leaves the lamp on for an extended period of time, the battery function may be impaired. Consequently, it would be desirable to provide a lighting system which ensures against unintended, extended operation of courtesy lamps.

It is an object of the present invention to provide a new and improved courtesy lamp system which prevents battery drain due to unintended courtesy lamp operation.

Another object of the invention is to provide a new and improved battery saver module for controlling both courtesy and IE lamps so as to prevent or limit unintended battery drain.

A further object of the invention is to provide such a battery saver module which is economical to manufacture and durable and reliable in use.

Accordingly, it has been found that the foregoing and related advantages are attained in a battery saver module for controlling courtesy and illuminated entry lamps which has inputs for receiving input signals from door handle sensors, door sensors, a trunk sensor, and an ignition switch and first and second outputs for connection to lamp loads. The first output connects to illuminated entry lamp loads for providing power thereto and the second output connects to courtesy lamp loads for providing power thereto. A control circuit selectively activates the first and second outputs responsive to input signals and includes a first timer for deactivating the first output at a first time period after receiving an input signal from a door handle sensor and a second timer for deactivating the second output at a second time period after receiving an input signal. The second time period is greater than the first time period.

In a preferred embodiment, the first timer is a timer-counter integrated circuit connected to the illuminated entry loads through a first relay for providing power thereto. The second timer is a timer-counter integrated circuit connected to the courtesy loads through a second relay for providing power thereto, but with a trunk lamp and trunk switch connected to the timer-counter and to the second relay such that the trunk lamp line functions as an input to the timer-counter and an output from the second relay.

BRIEF DESCRIPTION OF THE DRAWINGS

FIGS. 2, 2A–C are a schematic wiring diagram of the battery saver module of FIG. 1.

DESCRIPTION OF THE PREFERRED EMBODIMENT

Figure 1:
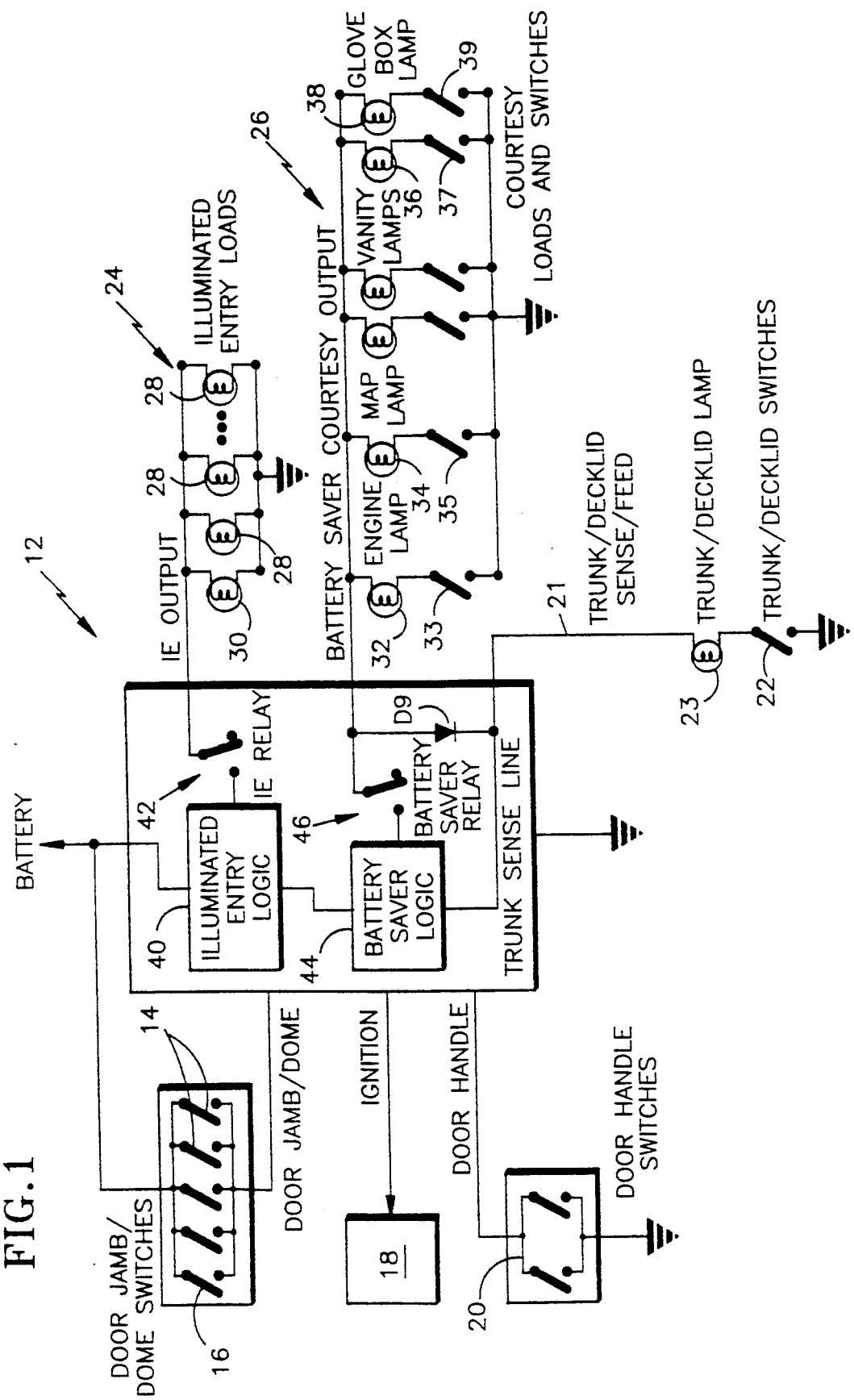
FIG. 1 is a system diagram of a courtesy and illuminated entry lighting system with the battery saver module of the present invention.

Although specific forms of the present invention have been selected for illustration in the drawings, and the following description is drawn in specific terms for the purpose of describing these forms of the invention, the description is not intended to limit the scope of the invention which is defined in the appended claims.

Referring to FIG. 1, the battery saver module of the present invention is generally designated by the numeral 12 and is interconnected to a courtesy and IE lighting system.

The battery saver module 12 controls activation/deactivation of the courtesy and IE lamps responsive to various input signals. In the illustrated embodiment, there are four input signal sources: (1) the plurality of the door jamb switches 14 and dome lamp switch 16; (2) ignition switch 18; (3) a plurality of door handle switches 20; and (4) trunk switch 22. The door jamb switches 14 are positioned in the door jams to sense when the automobile door is open, i.e., such as a door sensor. A common door jamb switch is a plunger-type switch. The door jamb switches are connected in parallel with the dome lamp switch 16. A conventional type of dome lamp switch is a rotary switch mounted to the instrument panel in combination with a head lamp switch function. The door handle switches 20 are positioned to sense the actuating movement of the exterior door handles, i.e., such as a door handle sensor.

The outputs from module 12 include the IE loads generally designated by the numeral 24 and the courtesy loads generally designated by the numeral 26. The IE loads comprise a plurality of lamps 28 positioned within the automobile interior such as under the instrument panel, etc. A dome lamp 30 is connected in parallel with the lamps 28.

The courtesy loads 26 comprise a plurality of separately switched courtesy lamps commonly identified as engine lamp 32 with serial switch 33, map lamp 34 with serial switch 35, vanity lamp 36 with serial switch 37 and glove box lamp 38 with serial switch 39. The trunk lamp 23 and serial switch 22 are also part of the courtesy loads but are connected directly to the module 12.

The module 12 generally comprises an IE logic circuit 40 with a first timer (47, R4, C3, R5 and R30) connected to an output relay 42 (K1) and associated circuitry (R10, Q6, R14, R15, R7 and Q1) for activating-/deactivating the IE loads 24 and a battery saver logic circuit 44 with a second timer (48, R11, C4, R12 and R31) connected to an output relay 46 (K2) and associated circuitry (C6, D10, R27, R26, Q4, D11, R23, R24, R32, R25, Q2 and D9) for activating/deactivating the courtesy loads 26 and the trunk lamp 23. The relay 42 is a single-pole/double-throw relay connected to switch power to the IE loads and the relay 46 is a single-pole/double-throw relay connected to switch power to the courtesy loads including the trunk lamp and to the coil of relay 42. Consequently, IE relay 42 cannot be activated unless battery saver relay 46 is activated.

Figure 2A:
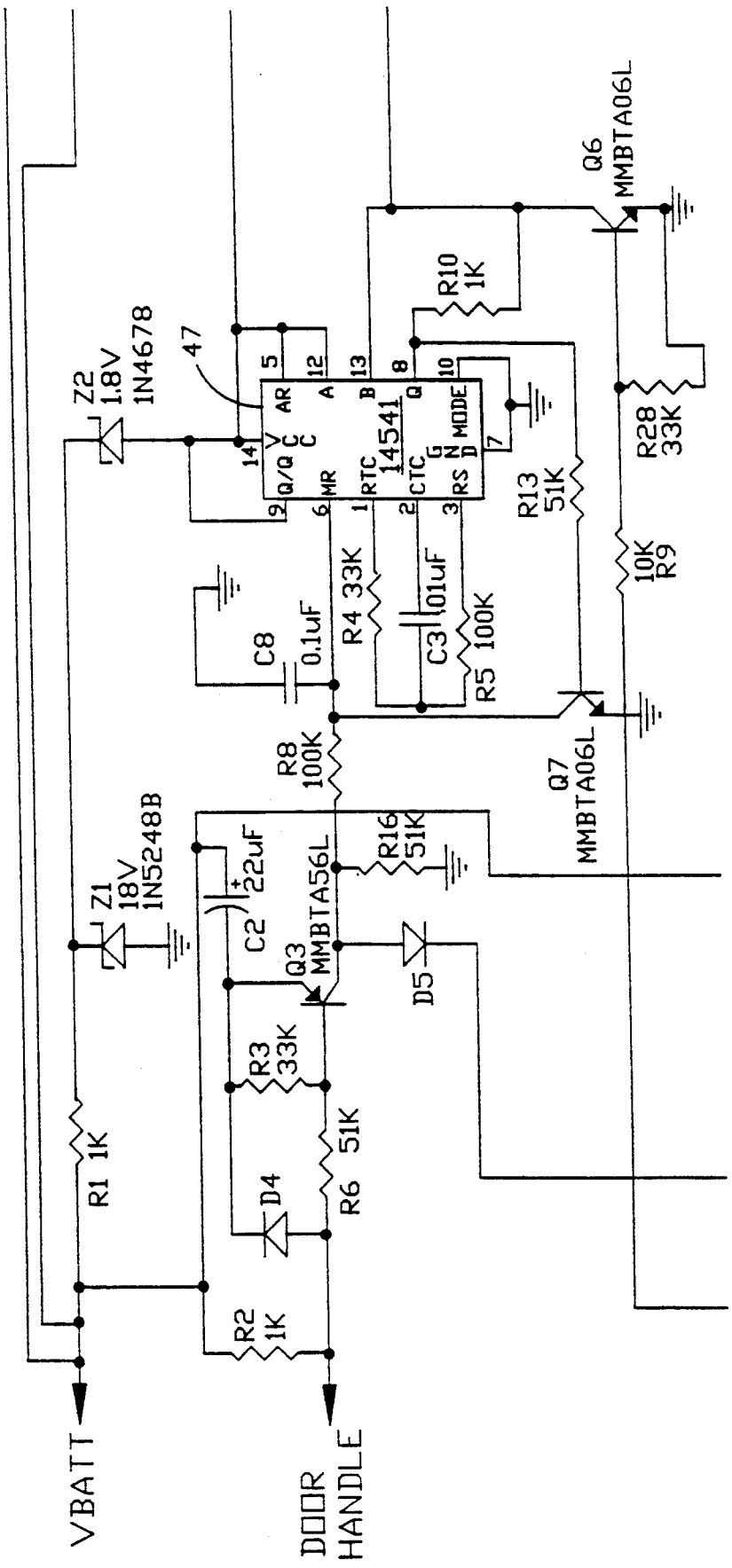
Figure 2B:
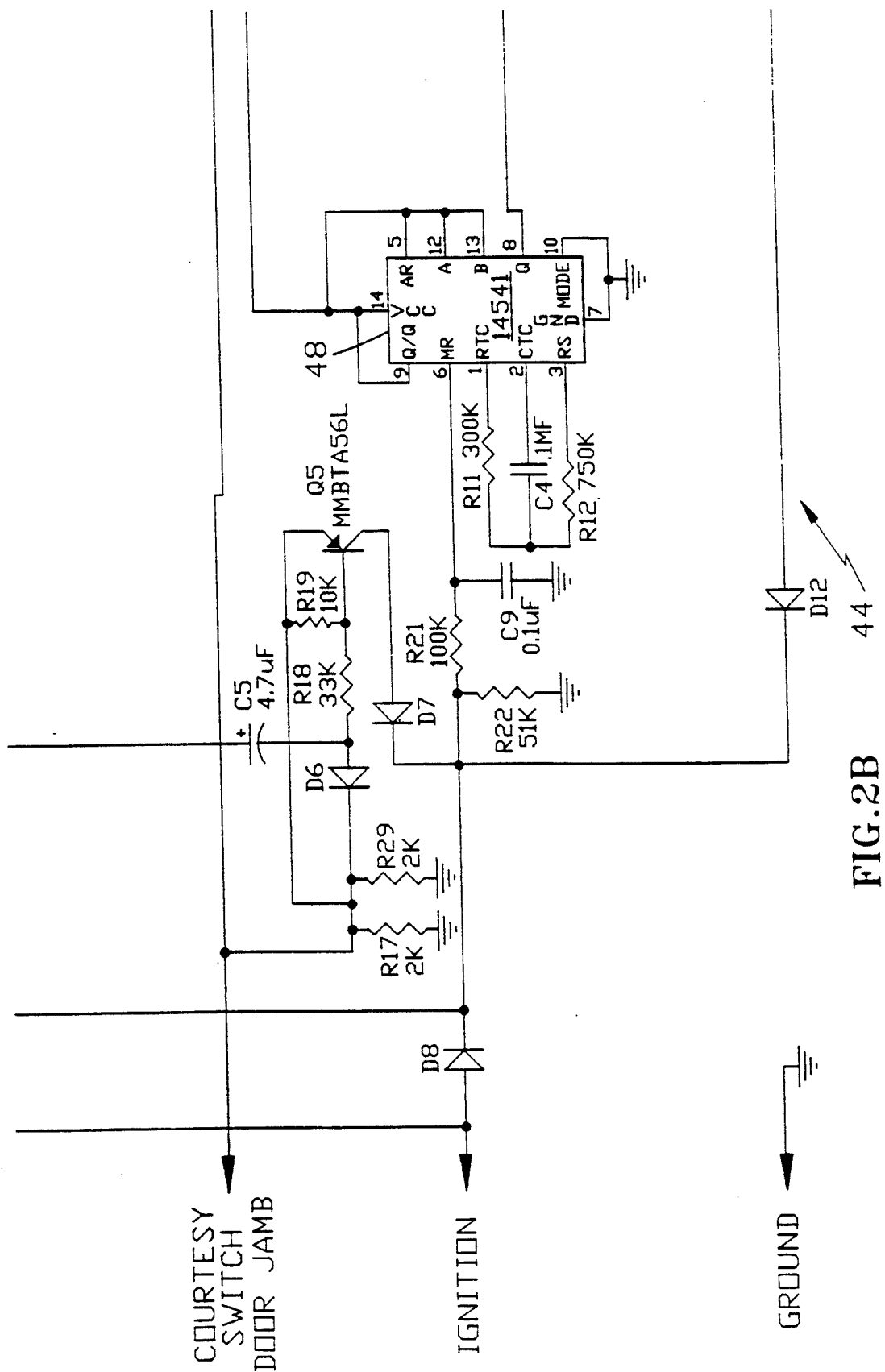
Figure 2C:
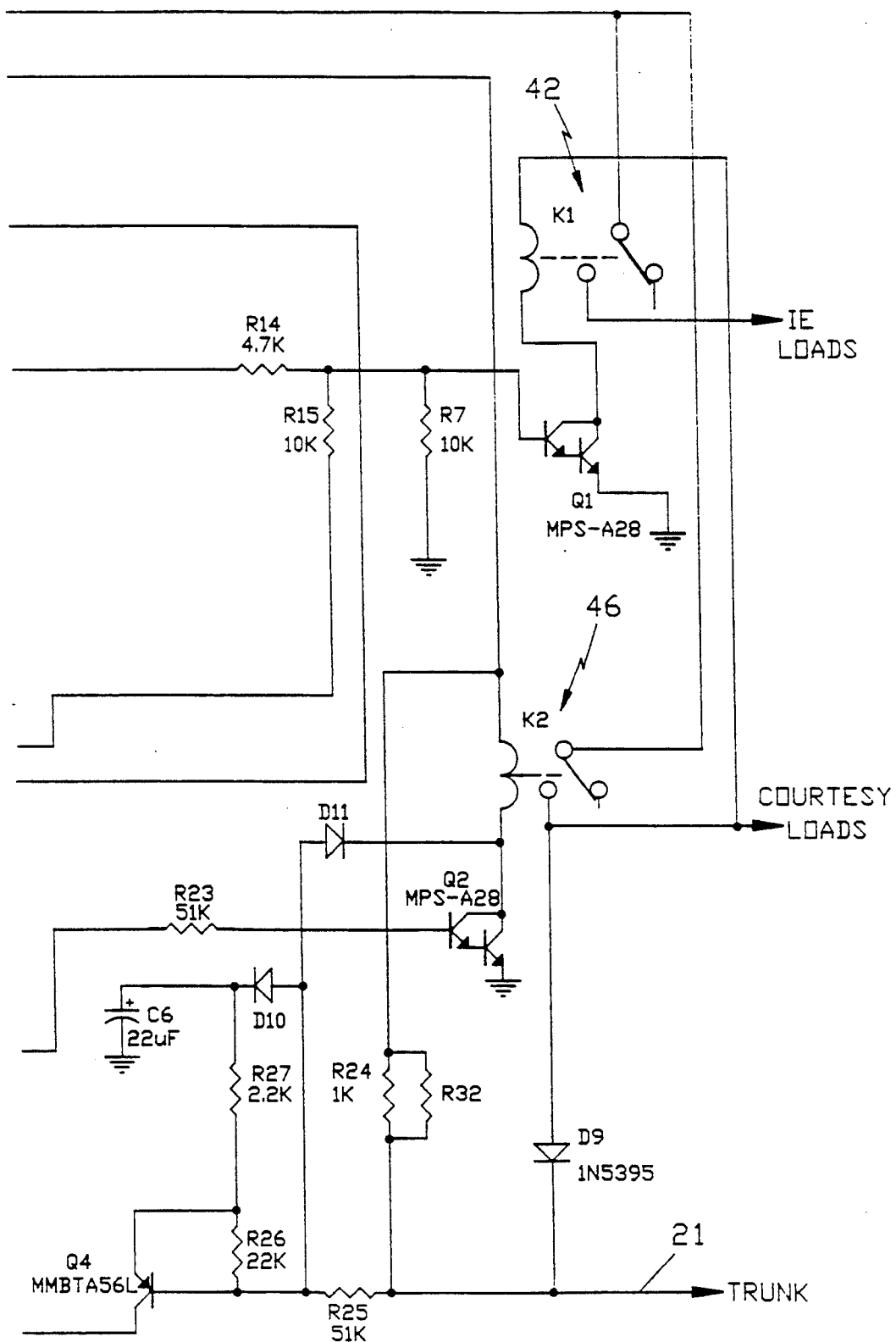

Referring to FIG. 2, the IE logic circuit 40 includes a CMOS 16 bit timer-counter integrated circuit 47 (hereinafter "IC") which is interconnected as shown to activate/deactivate the IE output loads responsive to input signals and to automatically deactivate the IE output loads at a first predetermined time after activation. Similarly, the battery saver logic circuit 44 includes a CMOS 16 bit timer-counter integrated circuit 48 which is interconnected as shown to enable/disable the courtesy output loads and trunk lamp responsive to input signals and to automatically deactivate same after a second predetermined time period. In the illustrated embodiment, the timer-counter integrated circuit is a Motorola MC-14541.

Functionally, the IE logic circuit 40 provides 25 seconds (nominal) of IE lamp illumination when the door handle switch 20 is activated. The battery saver logic circuit 44 provides a 45 minute (nominal) timeout of the IE output loads and the courtesy output loads including the trunk lamp 23. As will be explained, the 45 minute timer can be started from the door handle switch 20, the door jamb switches 14/dome switch 16, the trunk lamp switch 22, and the deactivation of the vehicle ignition 18.

When the system is in a timed out condition, the relays 42, 46 (K1, K2) are in an open position as shown in FIG. 2. With the system timed out, movement of the door handle so as to actuate the door handle switch 20 activates the IE loads and enables the courtesy loads by starting the 25 second IE timer and the 45 minute batter battery saver timer. In the illustrated embodiment, closing the door handle switch 20 produces as short-duration pulse through a one-shot circuit (R2, D4, R3, Q3, C2, R16 and C8) at the master reset pin 6 of IC 47 and the master reset pin 6 of IC 48 which activates the relays 42, 46 and starts the 25 second IE timer of IC 47 and the 45 minute battery saver timer of IC 48. As is known in the art, the timing periods of IC 47 and IC 48 are each set by the resistor and capacitor values (R4, C3, R5 and R30 for IC 47, and R11, C4, R12 and R31 for IC 48) connected to pins 1, 2, 3 and the relative connection configuration of pins 12 and 13 of each integrated circuit.

With the IE output loads being activated by the door handle switch 20, the lamps 28 and 30 will stay on for 25 seconds or until sooner deactivated by the ignition switch 18. Activation of the ignition switch 18 will immediately deactivate the IE output loads by shutting off transistor Q1 as governed by relay dropout driver circuit R9, R28 and Q6. While the 25 second timer is running, further door handle activations will not reset the 25 second timer because bypass circuit R13, Q7 remains active throughout the 25 second period, preventing the door handle one-shot circuit signal from reaching the reset pin. The door handle switch will however reset the 45 minute timer each time the 25 second timer is restart by generating a reset (D5, R21, R22 and pin 6 of IC 48). Further, a continuous door handle activation will not allow either timer to be reset or extended as the door handle switch must be opened and reclosed to activate these timers.

With the system timed out, the door jamb switches 14/dome switch 16 will activate the IE output loads and courtesy output loads by generating an input signal in the form of a short duration pulse at pin 6 of IC 48 to start the 45 minute battery saver timer, but not the 25 second IE timer. The 25 second IE timer can only be started by an input signal to pin 6 of IC 47 resulting from the door handle switch 20. The 45 minute timer is reset each time the input terminal 6 of IC 48 receives a short-duration pulse signal. A one-shot high-going pulse for this purpose is generated by logic circuitry in the module (i.e., capacitor C5, diodes D6, D7, resistors R18, R19, R29, R21 and transistor Q5) from the positive slope signal transition from the door jamb/dome switches. The IE loads are activated while one or more of the door jamb/dome switches are active (i.e., as a result of a door "open" condition or a dome switch "on" condition). The IE loads will remain active as long as one or more of the door jamb/dome switches is (are) active (i.e. have not closed door so as to shut off door jamb one shot circuit) until deactivated by the 45 minute battery saver timer. In the absence of further input signals, the courtesy load outputs and trunk lamp output will become disabled 45 minutes after the most recent positive slope signal transition on the input terminal because the Q pin of IC 48 will go low and drop out transistor Q2, which drops out power to relay K2.

The trunk lamp line 21 functions as both an input to the logic circuit 44 and as a power output to the trunk lamp load. This is achieved by using an isolation diode D9 to separate the trunk lamp circuit from the courtesy output loads 26 and to allow detection of the closure (active low) of the trunk lamp switch 22 while the courtesy output loads and trunk lamp are disabled. With the courtesy output loads and trunk lamp output load disabled, grounding of the trunk lamp switch 22 (through a maximum 100 OHM resistance) will cause the logic circuit 44 to activate the relay 46 which will supply power to the courtesy output loads and to the trunk lamp 23 through the isolation diode D9.

Referring more specifically to FIG. 2, with the module timed out, resistor pair R32, R24 holds transistor Q4 off until the trunk switch 22 is grounded. Closure (grounding) of the trunk switch turns transistor Q4 on for a period of time determined by the discharging of capacitor C6. This provides a one-shot high-going pulse through D12 and R21 to the master reset pin 6 of IC 48 which then starts a 45 minute batter saver timing cycle and turns on transistor Q2 and relay 46. The energizing of relay 46 enables the trunk lamp circuit by supplying lamp current through diode D9. While relay 46 is energized, openings and closures of the trunk switch 22 serve only to turn the trunk lamp off and on and do not generate additional resets of the 45 minute timer. If a timeout causes relay 46 to de-energize while the trunk switch is closed (trunk lamp on), the trunk lamp will turn off and the trunk switch will have to be opened and reclosed to retrigger the module.

An important feature of the trunk trigger circuitry becomes apparent when relay 46 de-energizes with the trunk switch closed. When this occurs, ground potential will appear at the trunk terminal of the module because the trunk lamp and switch are no longer being supplied from relay 46 through diode D9. It is necessary to prevent this ground signal from generating a reset pulse to IC 48 or the module will start a new 45 minute cycle and will never be able to timeout with the trunk switch closed. Diode D11 prevents this undesired reset pulse from occurring by keeping capacitor C6 discharged while relay 46 is energized. Because C6 is kept discharged, transistor Q4 is unable to generate a reset pulse when relay 46 de-energizes with the trunk switch closed. This keeps the unwanted reset of IC 48 from occurring when relay 46 de-energizes with the trunk switch closed. With the ignition off, the courtesy output loads and the trunk lamp load will remain activated for one battery saver timeout period (45 minutes) from the initial grounding of the trunk lamp switch 22. Once the relay 46 has been activated, further grounding of the trunk lamp switch 22 will not reset or extend the initial battery saver timing cycle.

While the ignition is on, the ignition provides a continuous (active high) input signal to IC 48 so as to constantly enable the battery saver output loads and deactivate the 25 second IE timer. With the ignition active, the IE output loads become active only when one or more of the door jam/dome switches is actuated (i.e., by a door open condition or a dome switch on condition). The 45 minute battery saver timer period begins when the ignition is deactivated so as to produce an ignition input signal with a negative slope. Thus, the ignition switch performs two basic functions with respect to the battery saver module. First, when the IE output loads have been activated by the door handle switch input signal, the activation of the ignition switch (within the 25 second timer period) functions to turn off the IE output loads. Secondly, when the system is timed out, activation of the ignition switch will activate the battery saver module to enable power to the IE and courtesy output loads. Notably, lights will not timeout as long as the ignition switch is "on" as all loads are continuously enabled.

One ordinary skill can appreciate that the other remaining circuit elements shown in FIGS. 2(i.e. R1, Z1, Z2, D8) aid in stabilizing and isolating the various circuits described herein.

As can be seen, a battery sensor module has been described which controls both courtesy and illuminated entry lighting so as to prevent unintented battery drain. Further, the batter saver module is economical to manufacture and durable and reliable in use.

As will be apparent to persons skilled in the art, various modifications and adaptations of the structure above described will become readily apparent without departure from the spirit and scope of the invention, the scope of which is defined in the appended claims.

I claim:

1. A battery saver module for controlling courtesy and illuminated entry lamps in an automobile comprising:

input means for receiving input signals from a door handle sensor, a door sensor, and an ignition switch, first output means for connection to illuminate entry lamp loads in said automobile for providing power thereto, second output means for connection to courtesy lamp loads in said automobile for providing power thereto, a control circuit means for selectively activating and deactivating said first and second output means responsive to at least one of said input signals being received by said input means, said control circuit means being connected to said input means and comprising:

means for activating said first output means responsive to receipt of at least one of said door handle sensor and door sensor input signals, means for activating said second output means responsive to receipt of an input signal from said door sensor, means for deactivating said first output means responsive to receipt of an input signal from said ignition switch, a first timer means for deactivating said first output means at a first time period after receiving said input signal from said door handle sensor, and a second timer means for deactivating said second output means at a second time period after receiving said input signal from said door sensor, said second time period being greater than said first time period.

2. The device of claim 1 wherein said first output means comprises a first switch connected to switch power to illuminated entry lamp loads and said second output means comprises a second switch connected to switch power to courtesy lamp loads.

3. The device of claim 2 wherein said second switch is connected to said first switch to activate/deactivate said first switch.

4. The device of claim 2 wherein said first and second switches are first and second relays respectively.

5. The device of claim 4 wherein said second relay is connected to said first relay to activate/deactivate said first relay.

6. The device of claim 1 wherein said input means comprises means for receiving an input signal from a trunk sensor.

7. The device of claim 6 wherein a trunk sense/feed terminal for connection to a trunk lamp and trunk lamp switch, said trunk sense/feed terminal being connected to said second output means for feeding power to the trunk lamp and connected to said input means for providing a trunk sense signal.

8. The device of claim 7 comprising means for isolating said trunk sense/feed terminal from said second output means when said second output means is deactivated.

9. The device of claim 8 wherein said isolating means comprises an isolation diode.

10. The device of claim 7 which comprises said second output means comprising a relay having a power output terminal for feeding power upon activation, said power output terminal being connected to said trunk sense/feed terminal, and means for isolating said trunk sense/feed terminal from said power output terminal when said relay is deactivated.

* * * * *

UNITED STATES PATENT AND TRADEMARK OFFICE
CERTIFICATE OF CORRECTION

PATENT NO.   : 5,321,309
DATED        : Jun. 14, 1994
INVENTOR(S)  : Darrell J. Kolomyski It is certified that error appears in the above-indentified patent and that said Letters Patent is hereby corrected as shown below:

Column 3, line 46, delete "batter".

Column 5, line 46, "One ordinary skill" should be --One of ordinary skill--.

Column 5, line 53, "batter" should be --battery--.

Column 6, line 1, "illuminate" should be --illuminated--.

Signed and Sealed this

Sixth Day of September, 1994

Attest:

BRUCE LEHMAN

Attesting Officer   Commissioner of Patents and Trademarks